United States Patent [19]

Oldham

[11] 4,252,405
[45] Feb. 24, 1981

[54] FIBRE-OPTIC CABLE JOINTS

[75] Inventor: Ronald C. Oldham, Chandlers Ford, England

[73] Assignee: International Standard Electric Corporation, New York, N.Y.

[21] Appl. No.: 50,377

[22] Filed: Jun. 20, 1979

[30] Foreign Application Priority Data

Jul. 18, 1978 [GB] United Kingdom ............... 30145/78

[51] Int. Cl.³ ................................................. G02B 5/16
[52] U.S. Cl. ................. 350/96.22; 174/84 R; 350/96.23
[58] Field of Search ............... 350/96.20, 96.21, 96.22, 350/96.23; 174/84 R, 88 C, 89

[56] References Cited

U.S. PATENT DOCUMENTS

| | | | |
|---|---|---|---|
| 2,449,983 | 9/1948 | Deval | 174/88 C |
| 3,171,707 | 3/1965 | Powell | 174/89 |
| 3,373,243 | 3/1968 | Janowiak et al. | 174/89 |
| 3,413,407 | 11/1968 | Potter | 174/89 |
| 4,107,451 | 8/1978 | Smith, Jr. et al. | 174/84 R |

FOREIGN PATENT DOCUMENTS 573661 11/1945 United Kingdom .
1499510 2/1978 United Kingdom .

*Primary Examiner*—Stewart J. Levy
*Attorney, Agent, or Firm*—John T. O'Halloran; Thomas N. Twomey

[57] ABSTRACT

A method of jointing two fibre-optic communications cables (1), having optical fibres (2) arranged in a tubular strength member (4), employing a mechanical ferrule (9, 13) to transmit the strain between the strength members of the two cables. Each cable end is terminated into a ferrule sleeve portion, the optical fibres are jointed, and then the ferrule sleeve portions are secured together.

2 Claims, 2 Drawing Figures

4,252,405

FIBRE-OPTIC CABLE JOINTS

BACKGROUND OF THE INVENTION

This invention relates to joints between fibre-optic communication cables and in particular to methods of, and ferrules for use in, making such joints.

Fibre-optic communications cables generally include some form of strength member to carry the strain involved in installing the cables in ducts or laying them underwater, since the fibres are not capable of bearing such strains themselves. When two fibre-optic cables are jointed there must, therefore, be means provided at the joint to transfer the strain from one cable strength member to the other cable strength member.

In the case of fibre-optic cables which are used for submarine purposes, it is necessary that the cable also includes metallic conductors for use in supplying electrical power to regenerators, which must be employed when the optical fibres are used for relatively long distances. When jointing such cables means must also be provided for jointing the metallic conductors. One such form of cable joint is disclosed in our co-pending U.S. application Ser. No. 965,678 (Parfree) in which individually clad optical fibres are arranged in an aluminum tube which acts as a protection against the effect of pressure. The split in the tube can be sealed by soldering or welding, thereby forming a pressure-resisting protective tube around the optical fibres. The tube is surrounded by a cylindrical strength member formed for example by one or more layers of high tensile steel wires or synthetic fibres, and this member is surrounded by a layer of copper tape which acts as a conductor for the supply of power to the regenerator, which is in turn surrounded by a layer of dielectric, for example polyethylene.

SUMMARY OF THE INVENTION

According to one aspect of this present invention there is provided a method of jointing two fibre-optic communications cables each having optical fibres arranged in a respective tubular strength member, including the steps of terminating the strength member of one cable into one portion of a two portion ferrule sleeve assembly, terminating the strength member of the other cable into the other portion of the ferrule sleeve assembly, jointing the optical fibres of the two cables, arranging the joints so formed in a cavity defined within the ferrule sleeve portions, and joining the two ferrule sleeve portions together.

According to another aspect of this present invention there is provided a ferrule for use in jointing two fibre-optic communications cables, each having optical fibres arranged in a respective tubular strength member, comprising two ferrule sleeves each provided with means whereby to grip the end of the strength member of a respective cable end, which sleeves can be screwed together and are such as to transfer strain between the strength members of the cables in use thereof, and a cavity defined within the ferrule which in use of the ferrule receives joints made between the optical fibres of the two cables.

According to a further aspect of this present invention there is provided a ferrule for use in jointing two fibre-optic communications cables each having optical fibres arranged in a respective tubular strength member which includes a conductive tube surrounding the fibres, comprising two sleeves each provided with co-operating parts which can hold the respective strength members clamped between the parts and held to the respective sleeves, screw-threaded means for securing the sleeves in the ferrule such as to transfer strain between the strength members in use of the joined cables, and a cavity within the ferrule for accomodating jointed optical fibres of the cables, the entrances to the cavity being designed to locate the free ends of the respective conductive tubes.

BRIEF DESCRIPTION OF THE DRAWINGS

An embodiment of the invention will now be described with reference to the accompanying drawings, in which.

DETAILED DESCRIPTION OF THE PREFERRED EMBODIMENTS

Figure 2:
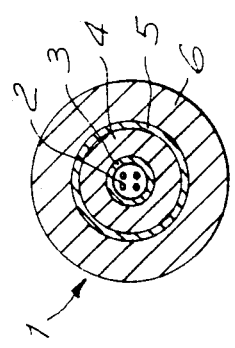
FIG. 2 shows, on a larger scale, a section through a fibre-optic cable of the type jointed in FIG. 1.

The fibre-optic communications cables 1 to be jointed are shown in FIG. 2 as having four suitably clad optical fibres 2 arranged in a protective aluminum pressure resistance tube 3 which is surrounded by a strength member 4 comprised, for example, of one or more layers of stranded high tensile steel wires laid up over tube 3, or alternatively windings of a tape or strands of a synthetic insulating material such as polyethyleneterephthalate glycol applied over tube 3. A tubular copper conductor 5 is arranged over the strength member 4, and a sheath 6 of plastics insulating material, such as polyethylene is extruded over the conductor 5.

To joint two fibre-optic cables their free ends must each first be prepared by removing the sheath 6 for a predetermined distance to expose the copper conductor 5. An end portion of the copper conductor 5 is then removed to expose the strength member 4, and an end portion of the strength member 4 is removed to expose the aluminum tube 3. An end portion of the tube 3 is removed to expose the optical fibres 2. The lengths of the fibres which are exposed must be sufficient to permit subsequent jointing as will be further described hereinafter.

Figure 1:
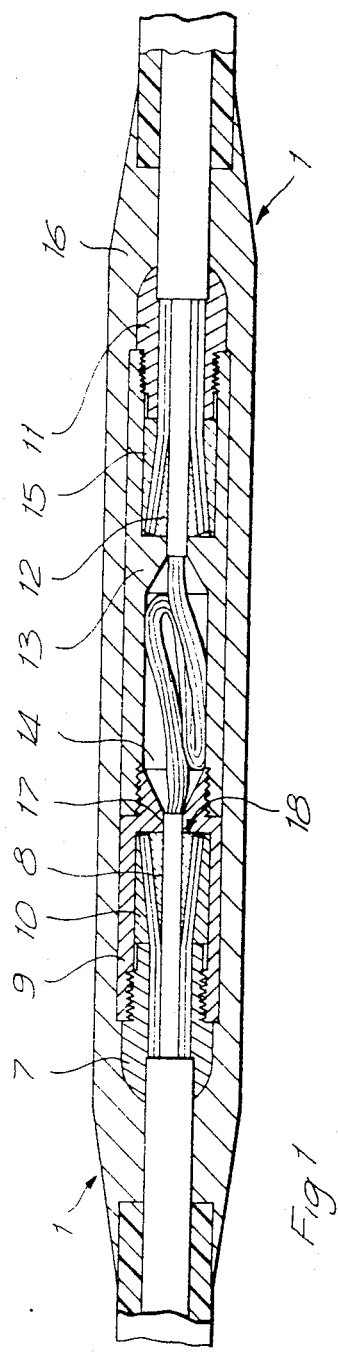
FIG. 1 shows, partially in section, a joint between two fibre-optic communications cables made by a method and employing a ferrule assembly according to an embodiment of this invention.

A compression nut 7, which has an external thread as indicated in FIG. 1, is slipped over one cable end before or after preparation thereof. A sleeve element 10, whose internal diameter over a region adjacent one end is a sliding fit over strength member 4 and which increases in a tapered manner towards the other end, is also slipped over the cable end. A tapered wedge element 8, comprising a cone with an axial bore, is positioned on the end of the tube 3 after splaying out the strands or tapes of the strength member 4. The strands or tapes are then relaid and a grip-improving medium may be forced between the strands or tapes. This medium may for example comprise carborundum or aluminium oxide grit in suspension in methylated spirit or epoxy resin. A first ferrule sleeve portion 9, which is internally threaded at one end and externally threaded at the other end, is positioned on the cable end, the optical fibres protruding therefrom through a cavity entrance which is a reduced internal diameter bore 17 thereof, which fits with a slight clearance (2 thou) the tube 3 and locate it. A corresponding arrangement locates tube 3 at the other cavity entrance.

The compression nut 7 and sleeve portion 9 are screwed together during which operation element 8 abuts the wall 18 of the sleeve portion 9 and the tapered portion of sleeve element 10 is forced into co-operation with the element 8 to grip the strength member 4 therebetween.

A second ferrule sleeve portion 13 together with a compression nut 11, a tapered wedge element 12 and a sleeve element 15 are applied to the other prepared cable end in a similar manner, with the optical fibres protruding from the free end of sleeve portion 13. The second sleeve portion 13 has an internal thread at one end thereof to co-operate with the compression nut 11 and an internal thread at the end thereof to cooperate with the external thread of the first sleeve portion 9. As can be seen from FIG. 1, the second sleeve portion 13 is longer than the first portion 9 so that when they are screwed together a cavity 14 is defined therein. While the first portion is shown as having a length approximately half that of the second portion, it would alternatively be possible, for each to have a hollow end which can be combined to form cavity 14 and the screwed joint to halfway along the entire length. The cavity could be formed in a separate intermediate sleeve with each portion as short as the first portion. In this case the first and second portions would be screwed together via the intermediate sleeve.

The threads of the compression nuts 7 and 11 may be locked by means for example of a suitable locking compound such as "Locktite A 602".

The joints between the optical fibres of the two cables which protrude from the ends of the ferrule portions 9 and 13 may be made by any conventional method, and when the ferrule portions 9 and 13 are screwed together the "excess" optical fibre is effectively "folded up" and accomodated with the joints in the cavity 14. Since the optical fibres are free to move within the pressure tube 3, the screwing of the ferrule portions together will not cause equivalent twisting of the fibres.

The ferrule and joint then has a moulding 16 of plastics insulation material compatible with the cable sheath material formed thereon to reconstitute the insulating sheath between the two cables 1. If the ferrule, comprising compression nuts 7 and 11 and sleeve portions 9 and 13, is made of a suitable electrically conductive material, for example enight steel, and the compression nuts are in good electrical connection with the copper conductors 5, then even if the strain member is of an electrically insulating material the ferrule will provide continuity of the copper conductor between the two cables, as well as jointing the strength members 4 of the cables and mechanically and electrically jointing the pressure tubes 3 protecting the optical fibres.

What is claimed is:

1. A ferrule for use in jointing two fiber-optic communications cables each having optical fibers arranged in a tubular strength member, having a stranded strength member surrounding said tubular strength member, having a tubular conductor surrounding said stranded strength member and having a sheath of polyethylene over said tubular conductor comprising, first and second ferrule sleeves of electrically conducting material each comprising,
    means for gripping said tubular strength member and said stranded strength member, and
    means for electrically contacting said tubular conductor,
said first ferrule sleeve having an externally threaded end,
said second ferrule sleeve having an internally threaded end for connection to said externally threaded end of said first ferrule sleeve,
each of said ferrule sleeves having an end wall for abutting contact with an end of one of said stranded strength members,
each of said end walls having a bore therethrough for receipt of a respective tubular strength member,
said second ferrule sleeve having a chamber for enclosing excess optical fiber at the fiber joint,
each of said means for gripping comprising,
    a ring element surrounding a respective stranded strength member and
    a wedge element surrounding a respective tubular strength member
    said ring element having a thickness which decreases toward the end of the respective stranded strength member,
    said wedge element having a thickness which increases toward the end of the respective stranded strength member,
    a compression nut of electrically conducting material having an externally threaded portion,
    an internally threaded portion of said respective ferrule sleeve for receipt of said compression nut
    wherein the end of said respective stranded member is positioned externally of said wedge element and internally of said ring element and
    whereby tightening of said compression nut causes said ring element to ride up on said wedge element while compressing said stranded strength member between said ring element and said wedge element and further causes said tubular strength member to be tightly gripped by said wedge member, and
said means for electrically contacting said tubular conductor comprising said compression nut,
    said compression nut overlying and locating the free end of said tubular conductor whereby tightening of said compression nut causes electrical contact between said tubular conductor and said ferrule sleeve.

2. In a fiber optic communications cable joint of the type designed for a watertight connection of cable comprising a plastic layer over a conductive tube surrounding a stranded strength member over a tubular strength member enclosing at least one clad optical fiber the improvement comprising, means for gripping said stranded strength member and said tubular strength member,
said means for gripping further providing electrical communication with said conductive tube and locating the free end of said conductive tube,
means for enclosing excess optical fiber within said joint, and
a moulded plastic insulating material enclosing said joint in a watertight manner.

* * * * *